United States Patent [19]
Huston et al.

[11] 3,837,521
[45] Sept. 24, 1974

[54] INSULATED METER ENCLOSURE

[76] Inventors: Richard A. Huston, 1009 N. Edgemoor, Wichita, Kans. 67207; Leroy W. McQueary, 210 N. Walnut, both of Wichita, Kans. 67203

[22] Filed: Jan. 10, 1972

[21] Appl. No.: 216,466

[52] U.S. Cl..................... 220/3.3, 220/3.8, 220/18
[51] Int. Cl............................................. H02g 3/08
[58] Field of Search ............... 220/3.3, 3.7, 3.8, 3.2, 220/24 H, DIG. 9, 18

[56] References Cited
UNITED STATES PATENTS

| | | | |
|---|---|---|---|
| 1,213,478 | 1/1917 | Haase | 220/3.8 |
| 1,395,807 | 11/1921 | Forni | 220/3.8 |
| 2,040,786 | 5/1936 | Ford | 220/DIG. 9 |
| 3,318,476 | 5/1967 | Clark | 220/3.8 |
| 3,392,867 | 7/1968 | Morris | 220/18 |
| 3,658,096 | 4/1972 | Higuera | 220/24 H |

OTHER PUBLICATIONS

The Plastics Manual, pp. 256–257, The Scientific Press Ltd., 1966, Plastics Pipe.
Rigid Urethane Foam, Dupont

*Primary Examiner*—George E. Lowrance
*Assistant Examiner*—Steven M. Pollard
*Attorney, Agent, or Firm*—John H. Widdowson

[57] ABSTRACT

An insulated meter enclosure has a sidewall of insulative material and a cover of insulative material portions. The meter enclosure mounts in the ground and utilizes a conventional meter box lid structure to which insulating portions are attached.

7 Claims, 3 Drawing Figures

3,837,521

INSULATED METER ENCLOSURE

Numerous types of meter enclosures and insulated covers are known in the prior art. However, these prior art devices are not adapted to enclose water meters, gas meters, and the like so as to protect them from the deteriorating elements of nature which will affect a meter instrument when the meter is placed out of doors. Other prior art devices are known in the art which are adapted to enclose and insulate plumbing fixtures and conduits so as to protect them in a cold temperature environment. None of the known prior art devices are adapted to enclose and insulate a meter which is installed for operation underground. Prior art water meter enclosures are usually concrete enclosures having a cast iron lid structure or cover and are not insulated so as to afford any substantial degree of protection from freezing. These prior art devices tend to insulate the enclosed meter to some extent but are not efficient. Also, the prior art enclosures tend to accept then trap moisture therein.

In one preferred specific embodiment, an insulated meter enclosure of this invention includes a sidewall constructed of insulative material adapted to be mounted in the ground and engaged with a conventional underground type of meter box lid that has additional insulated material portions attached to the lid and lid supporting structure. The meter enclosure is adapted to be mounted in the ground to enclose a water meter or the like in the cavity thereof with only the lid of the cover exposed at the surface of the ground.

One object of this invention is to provide an insulated enclosure structure overcoming the aforementioned disadvantages of the prior art devices.

Still, one other object of this invention is to provide an insulated enclosure structure having an insulated sidewall and an insulated top so as to enclose and rotect a meter or the like.

Still another object of this invention is to provide an insulated meter box enclosure adapted to insulate a water meter which is installed underground.

Yet, one additional object of this invention is to provide an insulated meter enclosure utilizing a conventional type water meter enclosure top structure.

Various other objects, advantages, and features of the invention will become apparent to those skilled in the art from the following discussion, taken in conjunction with the accompanying drawings, in which.

Figure 2:
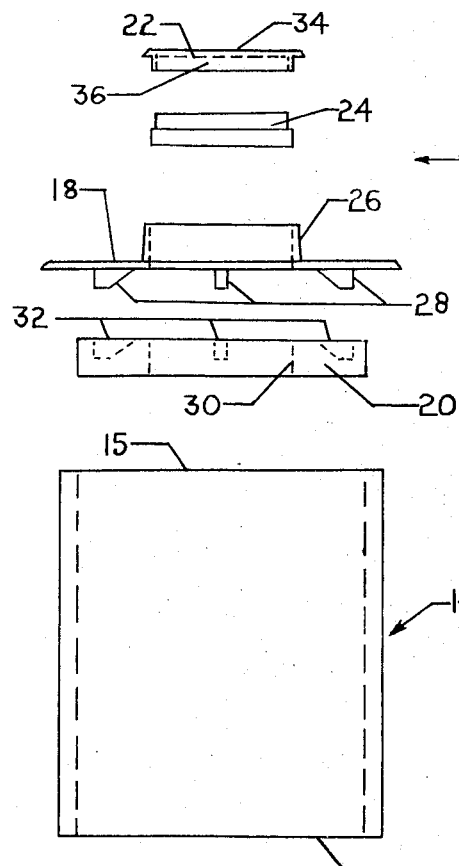
FIG. 2 is an exploded side elevation view of the insulated meter box structure with the insulated portions of the structure separated from the cover structure and in their normal relative positions.

The following is a discussion and description of preferred specific embodiments of the insulated meter enclosure structure of this invention, such being made with reference to the drawings, whereupon the same reference numerals are used to indicate the same or similar parts and/or structure. It is to be understood that such discussion and description is not to unduly limit the scope of the invention.

Figure 1:
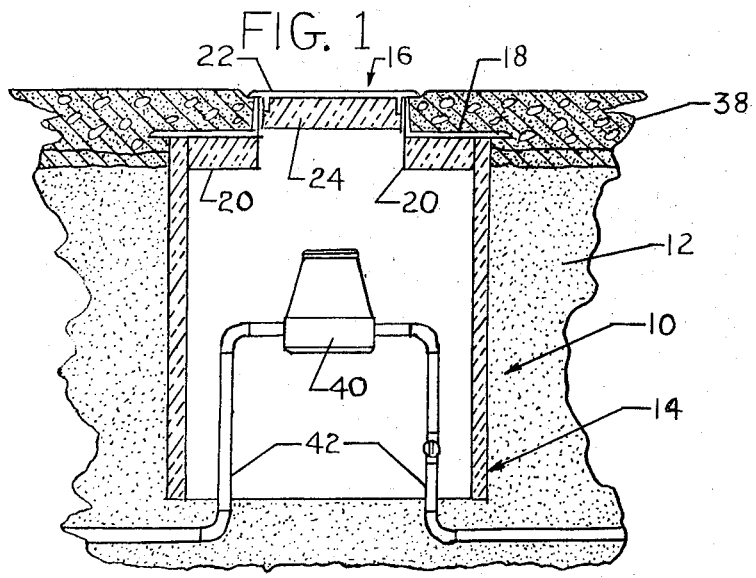
FIG. 1 is a cross-sectional elevation view of the insulated meter enclosure and a water meter installed underground.

Referring to the drawing in detail and in particular to FIG. 1, the insulated meter box enclosure is indicated generally at 10 and is installed in the ground 12. The insulated meter box enclosure structure 10 includes a sidewall 14 and a cover assembly 16. The sidewall 14 as shown in FIG. 1 is placed in the ground so as to receive a water meter in the cavity thereof. The upper end portion of the sidewall 14 is joined to the cover assembly 16 and is preferably immediately below the surface of the ground so that only the cap portion of the cover assembly is at the surface of the ground.

The enclosure sidewall 14 is preferably a cylindrical conduit segment constructed of insulating material and has a relatively large diameter as compared to its wall thickness. The upper end of the sidewall indicated at 15 is preferably planar so as to uniformly engage the cap support member of the cover assembly 16 as shown in FIG. 1. The lower end of the sidewall indicated at 17 is preferably open so that a water meter can be connected by a conduit or the like through its open end which is in open communication with the ground. The preferred cylindrical construction of the sidewall 14 can be varied to a conical shape or other shapes as desired without substantially changing the scope of the invention.

Figure 3:
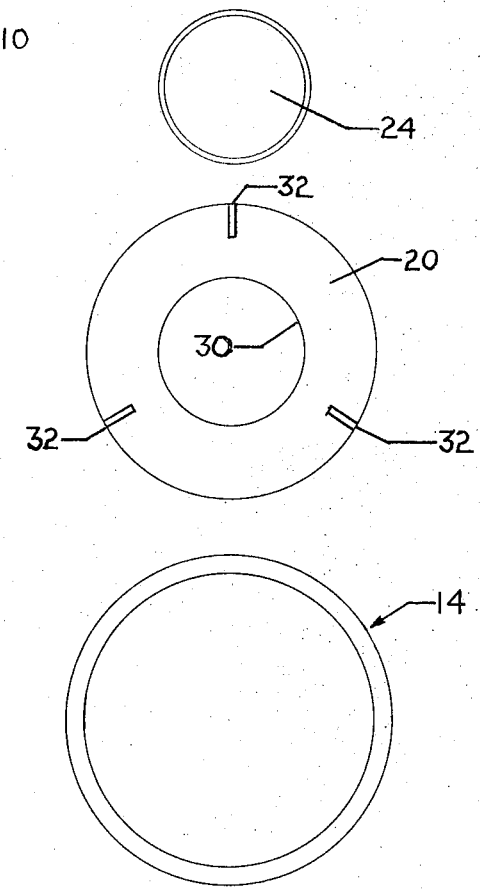
FIG. 3 is a top plan view of the insulated portions of the meter box structure including the sidewall, the cover insulating member, and the cap insulator member.

The meter enclosure cover structure is shown in FIG. 2 in a separated and exploded relation. The enclosure cover structure 16 includes a cover support member 18 with an attached cover support insulation member 20, a cap 22, and an attached cap insulation member 24. The cover support member 18 is circular in overall shape and has a collar 26 extending from its upper surface and a plurality of feet 28 extending from its lower surface. The collar 26 is adapted to receive the cap structure 22 to substantially seal the enclosure when in the installed position. The feet 28 hold the cover support member 18 in position concentric with the sidewall 14. The feet contact the sidewall 14 on its upper inside portion and retain the cover support member 18 in a relatively fixed position on the end of the sidewall 14. The cover insulator 20 is annular with an opening 30 in its interior portion aligning with the collar 26 on the cover support member. The support cover insulator 20 has a plurality of indentations in its outer portion adapted to fit around the feet 28 of the cover support member. The cover cap 22 has an imperforate upper portion 34 with an integral sleeve 36 extending from its lower surface adapted to snugly fit into the collar 26 on a cover support member 18. The cap insulation member 24 is a circular piece of insulating material adapted to fit inside the sleeve 36 and extend therefrom away from the upper cap portion 34. FIG. 2 shows the cover structure 16 in an exploded relation where the components thereof can be seen in their respectively relative relations. FIG. 3 shows the support cover insulator member 20 and cap insulator member 24 in a top plan view where the indentations thereof are visible. Both the cover insulator member 20 and cap insulator member 24 are preferably permanently attached to their respective supporting members 18 and 22.

It is to be noted that the cover support member 18 and cap 22 are preferably of the conventional design common to enclosures for underground meters which are in use today, specifically such as the residential type water meters. Several specifically different designs and configurations of conventional cover support members and caps 22 are available in the commercial market each of which vary slightly in its specific design but all of which have the same basic elements as described herein. Normally, the conventional cover support members and caps are constructed of cast iron material or the like.

The insulated members 14, 20, and 24 of this invention are preferably constructed of a material having good insulating qualities, or in other words a low heat conductivity. In practice it has been found that urethane foam provides perhaps the best material of construction for the insulated portions of the insulated meter box 10. Urethane foam has a K-factor of 0.13 BTU/HR/SQ. FT./degree F./inch, which has been found to substantially eliminate the possibility of freeze up of a water meter installed in the enclosure. The urethane foam material of the insulating members is resistant to mildew, fungus, attack by rodents, and deterioration by water and many other chemicals; thus it provides an excellent material for underground installation. It is to be understood that the preferred use of urethane insulative material is not to restrict the herein described invention, and other insulative materials can be used in the invention. As a practical matter installation of the insulating members 20 and 24 on the respective support members can be done by molding the urethane foam material directly onto the members or it can be done by separately molding the insulating members and then fixing them to the support members by use of an adhesive material.

In the actual installation of the insulated meter enclosure 10 of this invention, it is done so that the cap 22 is at the surface of the ground or the like as shown in FIG. 1. In the installed position shown in FIG. 1 the insulated meter enclosure has the lid 22 at the surface level of a layer of pavement 38 with the cover support member 18 and upper end portion of the sidewall 14 also imbedded in the pavement 38 and having the sidewall 14 extending therefrom below into the ground 12. A water meter 40 is installed in the cavity of the insulated meter enclosure 10 connected by conduits 42 entering the cavity through its lower open end portion prior to installation. Prior to being placed in the ground, the cover insulator 20 is secured to the cover support member 18 and the cap insulator 24 is secured to the cap 22 so that when the sidewall 14 is placed around the meter in the ground the cover assembly 16 can be easily set in place before the hole in which the meter enclosure is installed is filled. In the actual installation of the meter enclosure 10 the sidewall 14 can be placed immediately adjacent to the ground or wrapped with a felt backing paper material or the like so as to protect it from physical damage while the hole is being filled and material is being placed against the outside of the sidewall.

In the manufacture of the insulated meter box enclosure of this invention, it is obvious that the insulated material portions thereof can be easily molded and combined with a conventional cover support assembly to achieve the end product. The cover support insulation member 20 and the cap insulation member 24 can be easily and quickly molded from a urethane foam material or other materials and can easily be attached to a conventional cover structure. Similarly, the sidewall 14 can be easily molded from the preferred urethane material or other materials in order to achieve the end product. It is to be noted that the sidewall 14, cover support insulator member 20, and cap insulator member 24 can be easily constructed in various sizes in different specific shapes so as to be adapted for use with different cover structures of the same general nature.

In the use and operation of the insulatedd meter enclosure structure of this invention, it is seen that same provides an insulated enclosure which can be mounted in the ground and is adapted to enclose and protect from freezing and other elements a water meter or other device. The installation of the insulated meter enclosure 10 can be done as easily as installation of other similar non-insulated underground meter enclosures, yet when installed provide excellent protection for the enclosed device when in a low temperature environment. The insulating portions of the meter enclosure 10 of this invention can easily be molded with or attached to conventional enclosure covers. It is to be understood the reference to use of the herein described invention with a water meter is not to restrict the invention so as to prohibit its use with objects other than water meters.

As will become apparent from the foregoing description of the applicants' insulated meter box enclosure structure, relatively inexpensive and easily installed means have been provided to insulate a meter or similar device placed in the ground from damage due to a low temperature environment or damage common to such underground installations. The enclosure structure is economical to manufacture and easily attached to conventional cover structures for similar types of underground meter installations. The enclosure structure once installed does not change the appearance of the meter enclosure or substantially reduce the volume of its internal cavity yet the enclosure provides both insulation and other protection for the enclosed device.

While the invention has been described in conjunction with preferred specific embodiments thereof, it will be understood that this description is intended to illustrate and not to limit the scope of the invention which is defined by the following claims.

We claim:

1. An insulated meter enclosure comprising a conduit-like sidewall of thermal insulating material having a cavity therein, a cover support member positioned on one end of said conduit-like sidewall and including a structure defining a first aperture circumscribed by a collar integrally bound to a flanged base having a plurality of feet members attached thereto, a first insulating member including a plurality of grooves wherein said feet members snugly lodge to connect said first insulating member underneath said cover support member, said first insulating member comprising a second aperture having approximately the same areal opening as said first aperture and is superimposed thereby when said first insulating member and said cover support member are attached, a cap member engaging with the interior walls of said collar, and a second insulating member attaching to the underside of said cap member and being enclosed by the interior wall of said collar when said cap member is situated on top of said collar to enclose said cavity.

2. The meter enclosure of claim 1 wherein said conduit-like sidewall is essentially cylindrical.

3. The meter enclosure of claim 2 wherein said cover support member is generally circular with the outer peripheral portion of said flanged base engaging with said cylindrical conduit-like sidewall in an overlying relationship.

4. The meter enclosure of claim 1 wherein said first insulating member is enclosed and encompassed by the interior wall of said end of said conduit-like sidewall when said cover support member is positioned thereon.

5. The meter enclosure of claim 1 wherein said feet members are essentially trapezoidal shaped.

6. The meter enclosure of claim 5 wherein said grooves are essentially trapezoidal shaped.

7. The meter enclosure of claim 3 wherein said cap member and said first and said second aperture are generally circular.

* * * * *